Patented Nov. 24, 1931

1,833,065

UNITED STATES PATENT OFFICE

EMILIEN BORNAND AND HANS ARNOLD SCHLAEPFER, OF GENEVA, SWITZERLAND

FURNACE FOR TREATMENT OF METAL

Application filed November 29, 1929, Serial No. 410,582, and in France January 23, 1929.

This invention relates to a furnace for treatment of metal and has as its object the provision of means adapted to thoroughly stir up the metal in the furnace while in liquid state and to intimately mix the liquid metal with additional substances to increase and to hasten their reaction upon the metal.

Figure 1:
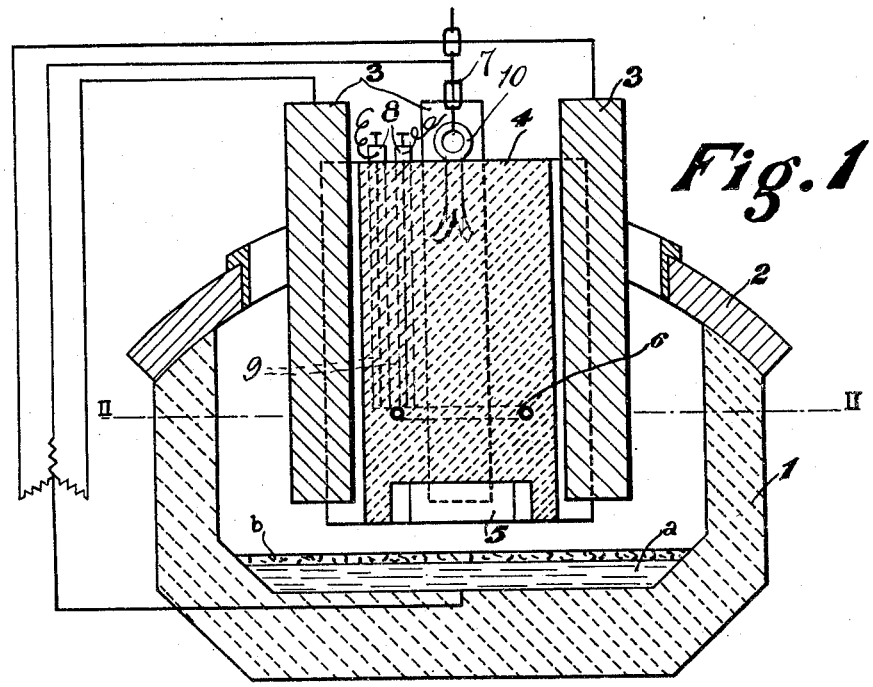
Figure 2:
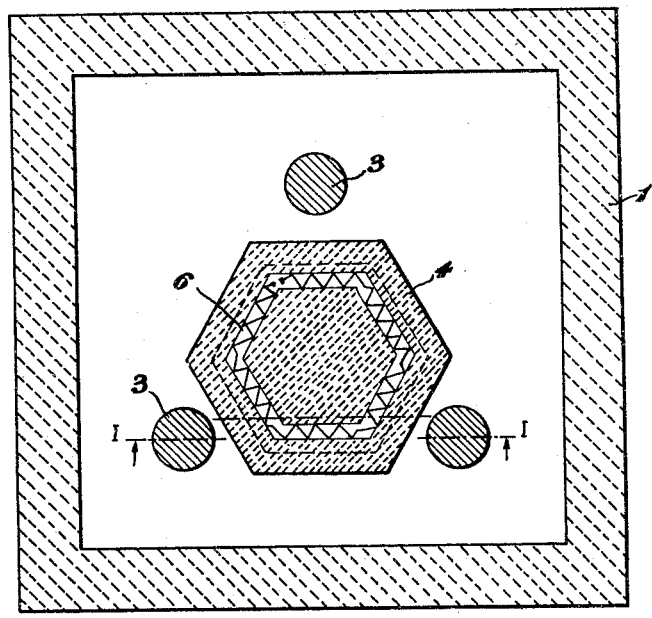

The accompanying drawings illustrate one embodiment of the invention as applied to a furnace used in the production of steel, Figure 1 showing the furnace in vertical section through line I—I of Figure 2, which is a transversal section through line II—II of Figure 1.

The furnace chamber 1 provided with a cover 2 is supplied with three-phase current of which the phases are star-connected with the neutral point connected to the bottom of the furnace chamber. Each one of the phases is connected to an electrode 3 penetrating through an opening in the cover 2. Also penetrating through the cover is a prismatic block 4 of hexagonal cross section and consisting of refractory material, such as for example magnesia. On its bottom face the block is provided with a cavity 5. $a$ indicates the molten steel in the furnace and $b$ the slag consisting of various oxides which are lighter than the steel and which slag is destined to act upon the metal.

The prismatic block 4 is arranged for vertical movement and for this purpose may be suspended by means of a bolt 10 and chain 7, or a steel cable, operated by any suitable lifting device, not shown.

In order to effect and to hasten the reaction in the charge, the slag has to be intimately mixed with the metal and for this purpose the current of the electrodes will be interrupted at certain intervals and the refractory block 4 will then be lowered and inserted into the metal bath to be again withdrawn therefrom. When this block is then lowered a part of the slag will enter into the cavity 5 and will be drawn into the interior of the molten metal so as to mix with the metal which at the same time is thoroughly stirred up. The refractory block forms a part of the cover of the furnace. This block is therefore sufficiently heated so as not to cause any thermal perturbations when it is inserted in the molten metal; it could be provided, if desired, with special heating means, for instance with an electric resistance 6 connected through passages 9 in the block 4 to terminal members 8 placed on top of the block and being connected to a high or low frequency current source. The block 4 could be heated also by hot gases provided from an outside source and circulating in its interior.

It is to be understood that the invention is not limited to electric furnaces for treating steel. The same arrangements could be used with open hearth furnaces or with furnaces for treatment of cast-iron.

The block 4 could also be given a movement of rotation about its central axis or a slightly eccentric axis when it is inserted in the metal bath to increase the stirring and mixing action.

We claim:

1. A furnace for treating metal, comprising a furnace chamber, a vertically movable refractory block adapted to be inserted into the molten metal in the furnace chamber, and means in the interior of said block for heating the refractory material.

2. An electric arc furnace for treating metals, comprising a furnace chamber having an open cover, a plurality of stationary electrodes, and a refractory block vertically movable in said open cover and separating the electrodes from each other, said refractory block having a cross sectional area of substantially smaller dimensions than that of the free surface of the charge in the furnace chamber and being adapted to be lowered into the molten charge and to be withdrawn therefrom to mix the different layers of the charge.

3. An electric arc furnace for treating metals, comprising a furnace chamber having an open cover, a plurality of stationary electrodes, and a refractory block vertically movable in said open cover and separating the electrodes from each other, said refractory block having a cross sectional area of substantially smaller dimension than the area of the free surface of the charge in the furnace chamber and being adapted to be lowered into the molten charge and to be withdrawn therefrom, the bottom face of the refractory block being provided with a cavity so that upon lowering the block into the molten charge the upper layers of the charge enter into said cavity and are brought into the interior of the charge.

In testimony whereof we affix our signatures.

EMILIEN BORNAND.
HANS ARNOLD SCHLAEPFER.